(12) United States Patent
Lee et al.

(10) Patent No.: US 9,543,561 B2
(45) Date of Patent: Jan. 10, 2017

(54) BATTERY

(75) Inventors: Jae Myoung Lee, Daejeon (KR); Eun Jin Kim, Daejeon (KR); Jae Yun Min, Daejeon (KR)

(73) Assignee: SK Innovation Co., LTD., Seoul (KR)

( * ) Notice: Subject to any disclaimer, the term of this patent is extended or adjusted under 35 U.S.C. 154(b) by 225 days.

(21) Appl. No.: 14/128,913

(22) PCT Filed: Jun. 20, 2012

(86) PCT No.: PCT/KR2012/004848
§ 371 (c)(1),
(2), (4) Date: Jan. 14, 2014

(87) PCT Pub. No.: WO2012/177034
PCT Pub. Date: Dec. 27, 2012

(65) Prior Publication Data
US 2014/0120405 A1 May 1, 2014

(30) Foreign Application Priority Data
Jun. 24, 2011 (KR) .......................... 10-2011-0061469

(51) Int. Cl.
| | | |
|---|---|---|
| *H01M 2/30* | (2006.01) | |
| *H01M 2/26* | (2006.01) | |
| *H01M 2/20* | (2006.01) | |
| *H01M 10/052* | (2010.01) | |

(52) U.S. Cl.
CPC .............. *H01M 2/26* (2013.01); *H01M 2/206* (2013.01); *H01M 2/266* (2013.01); *H01M 2/30* (2013.01); *H01M 10/052* (2013.01)

(58) Field of Classification Search
CPC ...... H01M 2/26; H01M 2/266; H01M 10/052; H01M 2/30; H01M 2/206
See application file for complete search history.

(56) References Cited

U.S. PATENT DOCUMENTS

| | | |
|---|---|---|
| 7,776,466 B2 | 8/2010 | Oh |
| 2004/0038122 A1 | 2/2004 | Hisamitsu et al. |

FOREIGN PATENT DOCUMENTS

| | | |
|---|---|---|
| JP | 11067281 | 3/1999 |
| JP | 2001076706 | 3/2001 |
| JP | 2002134094 | 5/2002 |
| JP | 2004247244 | 9/2004 |
| JP | 2005317315 | 11/2005 |
| JP | 2006108184 | 4/2006 |
| JP | 2007134233 | 5/2007 |
| JP | 2008108584 | 5/2008 |
| JP | 2008535158 | 8/2008 |
| JP | 2009541971 | 11/2009 |
| JP | 2011124024 | 6/2011 |
| KR | 1020100091372 | 8/2010 |

OTHER PUBLICATIONS

International Search Report—PCT/KR2012/004848 dated Nov. 22, 2012.
European Search Report—European Application No. 12803223.2 issued on Feb. 2, 2015, citing JP 2004 247244, JP 2007 134233, JP 2006 108184, JP 2001 076706 and US 2004/038122.

*Primary Examiner* — Helen O Conley
(74) *Attorney, Agent, or Firm* — IP & T Group LLP

(57) ABSTRACT

A battery comprises: a battery cell; and tabs configured as one pair of an anode tab and a cathode tab and included in the battery cell. At least one of the anode tab and the cathode tab is configured in such a way that a welding region exposed outside the battery cell and a reaction region positioned in the battery cell are formed of different metals and are joined to each other.

10 Claims, 3 Drawing Sheets

(A)

(B)

BATTERY

TECHNICAL FIELD

The present invention relates to a battery, and more particularly, to a battery for improving performance by joining heterogeneous metals of battery tabs.

BACKGROUND ART

A battery is largely classified into a primary battery and a secondary battery. The primary battery produces electricity via an irreversible reaction and thus cannot be reused after being used once. An example of the primary battery includes a commonly used battery, a mercury cell, a voltaic cell, and so on. On the other hand, the secondary battery uses a reversible reaction and thus can be recharged and reused after being used. An example of the secondary battery includes a lead storage battery, a lithium ion battery, a nickel-cadmium (Ni—Cd) battery, and so on. FIG. 1 is a diagram conceptually illustrating a structure of a typical lithium ion battery as a secondary battery. A lithium ion battery and a lithium ion polymer have the same structure except for appearance (liquid/solid) of electrolyte. In addition, materials of electrodes or electrolyte may slightly differ from FIG. 1 according to a battery. As illustrated in FIG. 1, the lithium ion battery is composed of an anode 1 generally formed of carbon, a cathode 2 generally formed of a lithium compound, an electrolyte 3 disposed between the anode 1 and the cathode 2, and electric wire 4 for connection between the anode 1 and the cathode 2. During charging, lithium ion in the electrolyte 3 moves toward the anode 1, and during discharging, moves toward the cathode 2. In this case, each electrode causes a chemical reaction while discharging or absorbing surplus electrons. During this process, electrons flows in the electric wire 4 to produce electric energy. Although the lithium ion battery has been described, other secondary batteries have the same basic principle and structure while only materials of electrodes or electrolytes are changed from the lithium ion battery. That is, in general, as described above, the secondary battery includes the anode 1, the cathode 2, the electrolyte 3, and the electric wire 4.

In this case, the secondary battery may include a single anode 1, a single cathode 2, a single electrolyte 3, and a single electric wire 4. Alternatively, in general, the secondary battery may includes a plurality of unit cells each composed of a single anode 1, a single cathode 2, a single electrolyte 3, and a single electric wire 4. That is, the plural unit cells 10 are contained in a secondary battery pack. Needless to say, the unit cells 10 are electrically connected to each other.

In general, the secondary battery includes a plurality of unit cells therein and is configured to externally expose one pair of external terminal tabs connected to electrodes of each cell (i.e., which is one pair of taps included per battery and functions as one anode connected to negative cells of each unit cell and one cathode connected to positive cells of each cell). In general, with regard to such a secondary battery, the plural secondary batteries instead of a single secondary battery are connected to each other to constitute a battery as one pack. Each battery of this type of battery pack is referred to as a cell (different from a unit cell included in a battery). Needless to say, tabs of each cell are electrically connected to each other.

In general, a battery is formed by stacking a plurality of cells and electrically connecting tabs of the cells to each other. In this case, methods such as bolt fastening, welding, and so on in order to connect the cells to each other. According to bolt fastening, problems arise in terms of the increased number of components and assembling processes. Thus, cell connection using welding has been widely used, in accordance with current trends. Various methods such as ultrasonic welding, laser welding, resistance welding, and so on may be used for welding for cell tab connection.

In general, a tab of a cell is divided into a cathode tab and an anode tab that are normally formed of different metals. For example, in a secondary lithium battery, in consideration of electrochemical stability, the cathode tab is formed of aluminum (Al) and the anode tab is formed of copper (Cu) or Cu plated with nickel (Ni). Needless to say, in order to increase electrochemical reactivity and stability, in most cases, the cathode tab and the anode tab are formed of different metals.

However, as described above, when cell tabs are welded to each other, since the cathode tab and the anode tab are formed of different materials, problems may arise in that joining cannot be smoothly achieved due to different physical properties. When joining cannot be smoothly achieved during welding, problems arise in terms of reduced durability and increased contact resistance. In addition, uniform welding intensity cannot be achieved which causes large deviation of product performance.

However, so far, researches have not been conducted to overcome these problems for battery manufacture. Accordingly, there are increasing demands and expectations of those of ordinarily skilled in the art for overcoming problems in terms of welding errors caused by different physical properties between positive and anode tabs.

DETAILED DESCRIPTION OF THE INVENTION

Technical Problem

The present invention provides a battery for maximizing weldability by forming cell tabs of heterogeneous metals such that welded portions have the same physical property.

Technical Solution

An object of the present invention is to provide a battery including a battery cell 110, and tabs 111 configured as one pair of an anode tab 111a and a cathode tab 111b and included in the battery cell 110, wherein at least one of the anode tab 111a and the cathode tab 111b is configured in such a way that a welding region P exposed outside the battery cell 110 and a reaction region S positioned in the battery cell 110 are formed of different materials and are joined to each other.

In this case, the battery 100 may be configured by arranging the plurality of battery cells 110, and the tabs 111 may each be formed of a film shape, the anode tab 111a and the cathode tab 111b may protrude over one side of the battery cell 110 such that film surfaces thereof are positioned in parallel to each other, the plural cells 110 may be arranged to constitute at least one row such that a film surface of the anode tab 111a of one cell is positioned in parallel to a film surface of the cathode tab 111b of a nearest adjacent cell 110 to the one cell 110, and the anode tab 111a of the one cell 110 and the cathode tab of the nearest adjacent cell 110 to the one cell 110 may be welded to each other.

The battery 100 may be configured in such a way that the anode tab 111a and the welding region P of the cathode tab 111b are formed of the same material.

The battery 100 may be configured in such a way that the cathode tab 111b is formed of a single material, and the welding region P of the anode tab 111a may be formed of the same material as the cathode tab 111b.

The battery 100 may be configured in such a way that the anode tab 111a is formed of a single material, and the welding region P of the cathode tab 111b may be formed of the same material as the anode tab 111a.

The battery 100 may further include a sealant 112 attached at an interface between the welding region P and the reaction region S of the tab 111.

The battery 100 may be a secondary lithium battery, and the cathode tab 111b may be formed of aluminum (Al) and the anode tab 111a may be configured in such a way that the welding region P is formed of Al and the reaction region S is formed of copper (Cu) or Cu plated with nickel (Ni).

In addition, the battery 100 may be a secondary lithium battery, and the anode tab 111a may be formed of copper (Cu) or Cu plated with nickel (Ni) and the cathode tab 111b may be configured in such a way that the welding region P is formed of Cu or Cu plated with Ni and the reaction region S is formed of Al.

Advantageous Effects

Conventionally, when cell tabs of a battery are connected via welding, welded portions of an anode tab and a cathode tab are formed of different materials, and thus, problems arise in that in that welding cannot be smoothly achieved due to different physical properties. Accordingly, the problems are originally prevented, thereby maximizing weldability. Accordingly, according to the present invention, the weldability of the cell is remarkably improved, thereby originally preventing problems in terms of reduced durability and increased contact resistance to increase durability and reduce contact resistance. In addition, welding performance of the cell tab is highly maintained, thereby achieving uniform weldability, thereby preventing performance deviation between products due to conventional welding errors.

EXPLANATION OF REFERENCE NUMERALS

Figure 1:
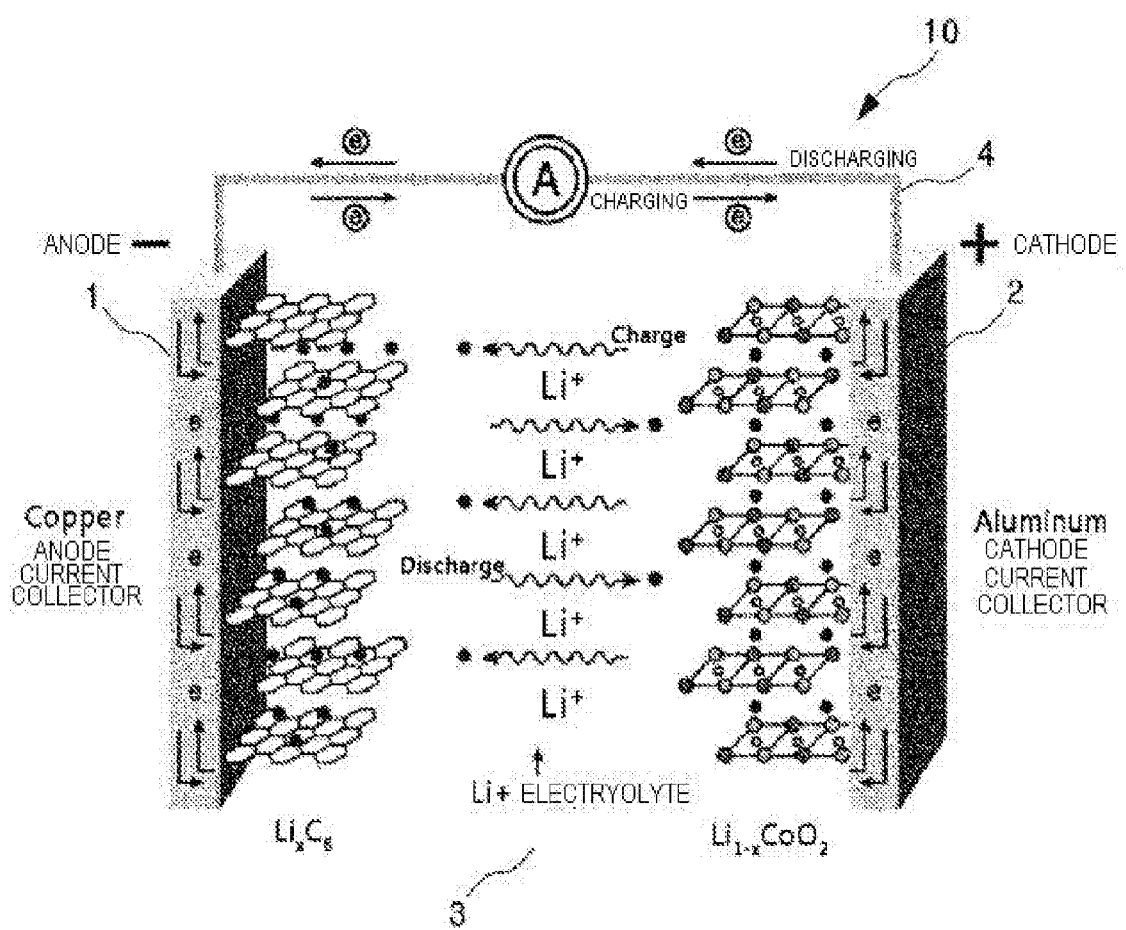
FIG. 1 is a diagram conceptually illustrating a structure of a typical lithium ion battery as a secondary battery.

100: battery (according to an embodiment of the present invention)
110: cell 111: tab
111a: anode tab 111b: cathode tab
112: sealant 120: support member

BEST MODE

Hereinafter, embodiments of the present invention will be described through the following Examples in detail with reference to the accompanying drawings.

Figure 2:
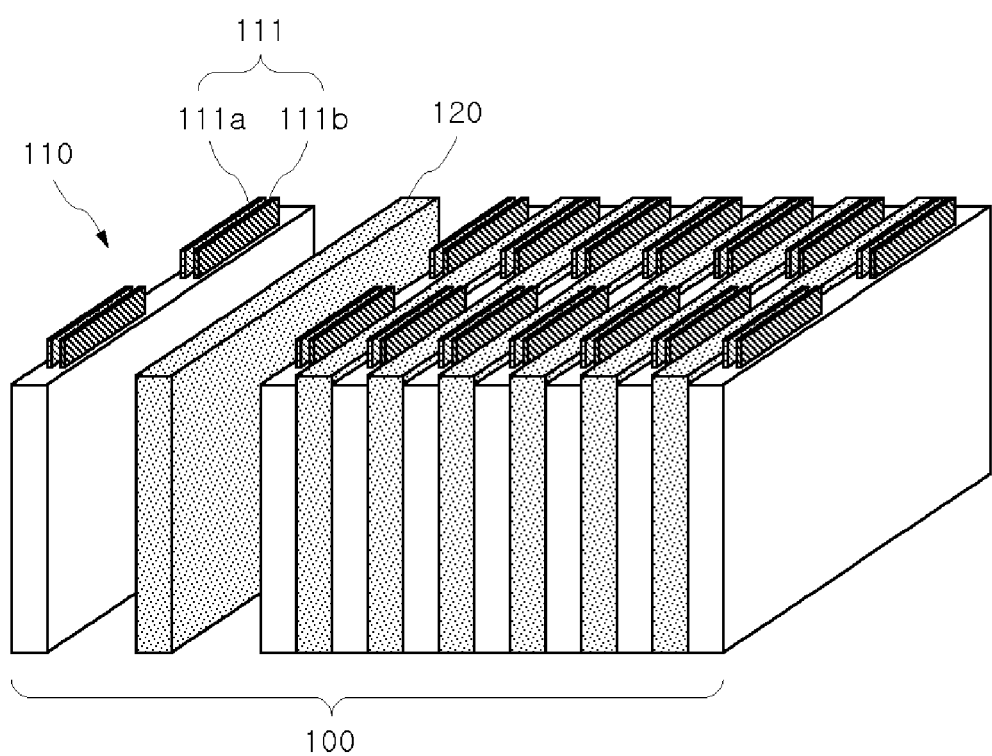
FIG. 2 is a perspective view of a structure of a battery.

FIG. 2 is a perspective view of a structure of a battery 100. As illustrated in FIG. 2, the battery 100 according to the present embodiment includes a battery cell 110, and one pair of tabs 111 including an anode tab 111a and a cathode tab 111b that are included in the battery cell 110. In the following description, as a commonly commercialized battery form, a plurality of battery cells 110 are arranged, but the present invention is not limited thereto.

The battery 100 is configured in such a way that the plural battery cells 110 including the pair of tabs 111 are arranged. As to the tabs 111, one anode tab 111a and one cathode tab 111b are included per cell 110, and that is, one cell 110 includes one pair of tabs 111. In this case, the tab 111 is formed of a film shape, and the anode tab 111a and the cathode tab 111b protrude over one side of the cell 110 such that film surfaces thereof are positioned in parallel to each other. (According to an embodiment of the present invention, in the diagram, although the tab 111 protrudes upward, the tabs 111 may protrude over opposite lateral surfaces of the battery 100 and may not be fixed to an upper side.) In addition, the cells 110 are arranged to constitute at least one row such that a film surface of the anode tab 111a of one cell 110 is positioned in parallel to a film surface of the cathode tab 111b of a nearest adjacent cell 110 to the above cell 110. In detail, as illustrated in FIG. 2, the cell 110 generally has a flat rectangular parallelepiped shape and is configured in such a way that the pair of tabs 111 extend in parallel to a wide surface in perpendicular to a narrow surface of the cell 110. In addition, the cells 110 are arranged so as to overlap wide surfaces thereof. Thus, the tabs 111 formed in parallel to the wide surface of the cell 110 are inevitably arranged in parallel to each other as the cells 110 are arranged.

In this case, a support member 120 for fixedly supporting a location of the cell may be interposed between the cells 110. With regard to a cell tab connection structure according to an embodiment of the present invention, presence of the support member 120 is not importantly considered. Briefly, the support member 120 is a structure employed by a typical battery and may be formed of a metallic material such as Al or an electrical insulating material.

Conventionally, when the tabs 111 are connected via welding, welded portions of the anode tab 111a and the cathode tab 111b are formed of different materials, and thus, problems arise in that in that welding cannot be smoothly achieved due to different physical properties. Accordingly, in order to overcome this problem, the present invention proposes a structure obtained by joining heterogeneous metals of the tabs 111, by the basic battery structure formed as described above, which will be described below.

As seen from the basic battery structure illustrated in FIG. 2, the tabs 111 are formed of a film shape and are arranged in parallel to each other. In this case, the tabs 111 may be welded to each other so as to be electrically connected to each other. In more detail, the anode tab 111a of one cell 110 is welded to the cathode tab 111b of a nearest adjacent cell 110 to the above cell 110.

In this case, as described above, conventionally since the anode tab 111a and the cathode tab 111b are formed of different materials, problems arise in that in that welding cannot be smoothly achieved. In order to overcome this problem, according to the present invention, with regard to the tab 111, at least one of the anode tab 111a and the cathode tab 111b is configured in such a way that a welding region P exposed outside the cell 110 and a reaction region S positioned in the cell 110 are formed of different materials and are joined to each other.

Figure 3:
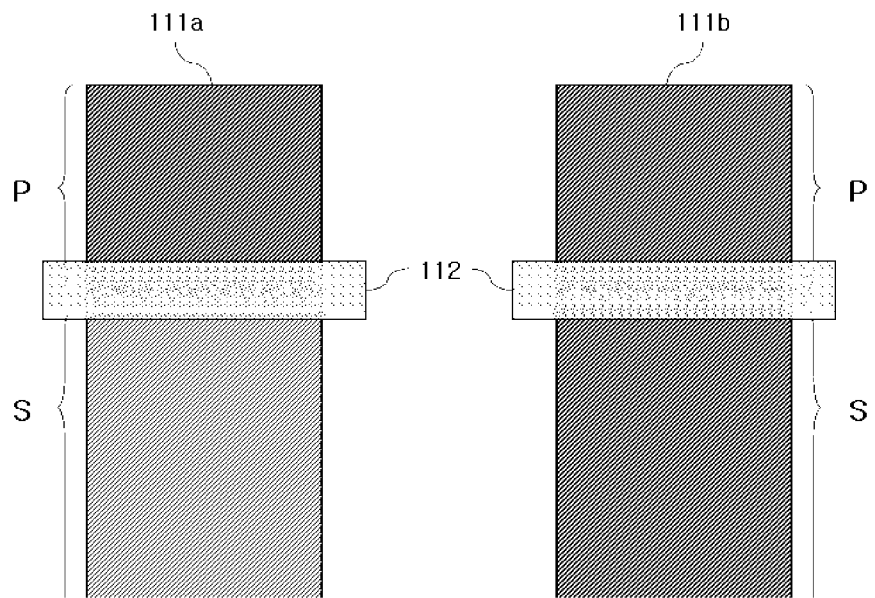
FIG. 3 is a diagram illustrating a structure of a heterogeneous joining tab according to an embodiment of the present invention.
Figure 3:
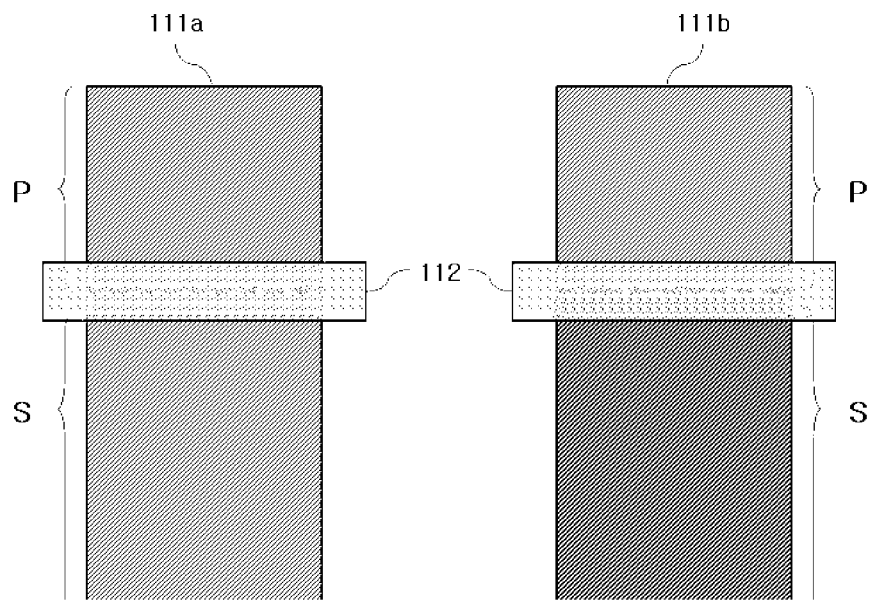

FIG. 3 is a diagram illustrating a structure of tab 111 according to an embodiment of the present invention. As illustrated in FIG. 3, regardless of whether it is the anode tab 111a or the cathode tab 111b, the tab 111 is divided into the reaction region S that is positioned in the cell 110 and directly contacts an electrolyte in the cell to cause a reaction, and the welding region P is exposed outside a packing material of the cell 110 for welding.

As described above, according to the present invention, at least one of the anode tab 111a and the cathode tab 111b is configured in such a way that the welding region P and the reaction region S are formed of different metals. In this case, in the battery 100 according to the present embodiment, the welding regions P of the anode tab 111a and the cathode tab 111b are formed of the same material.

(A) of FIG. 3 illustrates an embodiment of a structure of a tab. In the embodiment of (A) of FIG. 3, the cathode tab 111b is formed of a single material as in a conventional battery, and the welding region P of the anode tab 111a is formed of the same as a material of the cathode tab 111b. That is, in the embodiment of (A) of FIG. 3, the cathode tab 111b is a tab formed of a single material as in the conventional battery, and the anode tab 111a is a heterogeneous joining tab, the welding region P and the reaction region S of which are formed of different materials.

For example, when the battery 100 is a secondary lithium battery, the cathode tab 111b may be formed of Al, and the anode tab 111a may be configured in such a way that the welding region P is formed of Al and the reaction region S is formed of Cu or Cu plated with Ni.

Accordingly, electrochemical reaction appropriately occurs in the cell 110 and since the welding region P of the anode tab 111a is formed of the same material as that of the cathode tab 111b, connection errors due to different physical properties during welding are prevented.

(B) of FIG. 3 illustrates another example of a structure of a tab. Oppositely to (A) of FIG. 3, the anode tab 111a may be formed of a single material, and the welding region P may be formed of the same material of that of the anode tab 111a. Also, for example, when the battery 100 is a secondary lithium battery, the anode tab 111a may be formed of Cu or Cu plated with Ni, and the cathode tab 111b may be configured in such a way that the welding region P is formed of Cu or Cu plated with Ni and the reaction region S is formed of Al. In this case, also, since the cathode tab 111b is formed of a heterogeneous joining tab, electrochemical reaction with an electrolyte appropriately occurs in the cell 110 with regard to the cathode tab 111b without changing from the conventional battery, and the welding region P exposed outside the cell 110 is formed of the same material as that of the anode tab 111a, and thus, welding is smoothly achieved.

Needless to say, the present invention is not limited to the case in which any one of the anode tab 111a or the cathode tab 111b is a heterogeneous joining tab, as illustrated in FIGS. 3(A) and 3(B). A heterogeneous joining tab according to an embodiment of the present invention may be applied to both the two tabs. In other words, both the anode tab 111a and the cathode tab 111b may be heterogeneous joining tabs. That is, both the two tabs may be heterogeneous joining tabs by selecting a material having high welding performance and high electric conductivity for the welding region P and selecting a material having high electrochemical reactivity for the reaction region S.

In addition, as illustrated in FIG. 3, a sealant 112 may be attached at an interface between the welding region P and the reaction region S. Accordingly, joining intensity between the welding region P and the reaction region S may be reinforced while increasing sealing properties of the cell 110.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to the present invention, during welding, weldability between cell tabs is maximized, durability is increased, contact resistance is reduced, uniform weldability is achieved, and performance deviation between products is prevented.

The invention claimed is:

1. A battery comprising:
   a battery cell;
   a first tab extending from inside the battery cell to outside the battery cell and including a first reaction region and a first welding region,
   a second tab extending from inside the battery cell to outside the battery cell and including a second reaction region and a second welding region;
   wherein the first reaction region extends from the battery cell in a first direction,
   wherein the first welding region extends from the first reacting region to outside the battery cell in the first direction,
   wherein the first reaction region and the first welding region are arranged side by side in the first direction and do not overlap each other,
   wherein the second reaction region extends from the battery cell in a second direction,
   wherein the second welding region extends from the second reacting region to outside the battery cell in the second direction,
   wherein the second reaction region and the second welding region are arranged side by side in the second direction and do not overlap each other,
   wherein the first welding region is formed of the same material as the second welding region, and
   wherein first reaction region is formed of different material from the second reaction region.

2. The battery of claim 1,
   wherein the first welding region is formed of a single layer, and
   wherein the second welding region is formed of a single layer.

3. The battery of claim 1,
   wherein the second direction is the same as the first direction, and
   wherein the first tab and the second tab extend in parallel to each other.

4. The battery of claim 1,
   wherein the first reaction region includes a first metal,
   wherein each of the first welding region, the second reaction region, and the second welding region includes a second metal, and
   wherein the second metal is different from the first metal.

5. The battery of claim 1,
   wherein the second reaction region includes a first metal,
   wherein each of the second welding region, the first reaction region, and the first welding region includes a second metal, and
   wherein the second metal is different from the first metal.

6. The battery of claim 1,
   wherein the first reaction region is not exposed to outside the battery, and
   wherein the second reaction region is not exposed to outside the battery.

7. The battery of claim 1,
wherein the first welding region and the second welding region are welded to each other.

8. The battery of claim 1, further comprising:
a sealant provided along a fringe of the battery cell and sealing the battery cell,
wherein the sealant further extends (i) between the first reaction region and the first welding region, (ii) between the second reaction region and the second welding region, or (iii) both.

9. The battery of claim 1,
wherein the battery is a secondary lithium battery,
wherein the first reaction region includes Cu, and
wherein each of the first welding region, the second reaction region, and the second welding region includes Al.

10. The battery of claim 1,
wherein the battery is a secondary lithium battery,
wherein the second reaction region includes Al, and
wherein each of the second welding region, the first reaction region, and the first welding region includes Cu.

\* \* \* \* \*